United States Patent
Ikeda et al.

(10) Patent No.: US 10,465,601 B2
(45) Date of Patent: Nov. 5, 2019

(54) VARIABLE NOZZLE UNIT AND VARIABLE-CAPACITY SUPERCHARGER

(71) Applicant: IHI Corporation, Koto-ku (JP)

(72) Inventors: Kengo Ikeda, Koto-ku (JP); Yoshimitsu Matsuyama, Koto-ku (JP)

(73) Assignee: IHI Corporation, Koto-ku (JP)

( * ) Notice: Subject to any disclaimer, the term of this patent is extended or adjusted under 35 U.S.C. 154(b) by 265 days.

(21) Appl. No.: 15/511,367

(22) PCT Filed: Sep. 17, 2015

(86) PCT No.: PCT/JP2015/076504
§ 371 (c)(1),
(2) Date: Mar. 15, 2017

(87) PCT Pub. No.: WO2016/052231
PCT Pub. Date: Apr. 7, 2016

(65) Prior Publication Data
US 2017/0298813 A1    Oct. 19, 2017

(30) Foreign Application Priority Data
Oct. 2, 2014 (JP) .................................. 2014-203956

(51) Int. Cl.
*F02B 37/24* (2006.01)
*F02B 39/00* (2006.01)
(Continued)

(52) U.S. Cl.
CPC ............ *F02B 37/24* (2013.01); *F01D 11/003* (2013.01); *F01D 17/165* (2013.01); *F02B 39/00* (2013.01);
(Continued)

(58) Field of Classification Search
CPC ... F01D 5/02; F01D 9/04; F01D 9/041; F01D 9/045; F01D 11/00; F01D 11/003;
(Continued)

(56) References Cited

U.S. PATENT DOCUMENTS 5,964,574 A * 10/1999 Meier ..................... F01D 9/045
415/110
6,739,134 B2 * 5/2004 Fledersbacher ....... F01D 17/165
415/157
(Continued)

FOREIGN PATENT DOCUMENTS

CN    102713198 A    10/2012
CN    103946485 A    7/2014
(Continued)

OTHER PUBLICATIONS

International Search Report dated Dec. 22, 2015, in PCT/JP2015/076504 filed Sep. 17, 2015.

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A variable nozzle unit in a variable-capacity supercharger includes: a first nozzle ring disposed in a turbine housing and formed with a plurality of first support holes; a second nozzle ring disposed to face the first nozzle ring and formed with a plurality of second support holes that are through-holes corresponding to the first support holes; a plurality of variable nozzles supported rotatably by the first and second nozzle rings; and a plurality of seal members disposed between a turbine scroll channel and a turbine wheel side. The variable nozzles include first nozzle shafts that are rotatably supported by the first support holes, and second nozzle shafts that are rotatably supported by the second support holes, and a first seal member included in the (Continued)

plurality of seal members is provided at the turbine wheel side relative to the second support holes.

7 Claims, 6 Drawing Sheets

(51) Int. Cl.
  *F01D 17/16* (2006.01)
  *F01D 11/00* (2006.01)
(52) U.S. Cl.
  CPC ......... *F05D 2220/40* (2013.01); *Y02T 10/144* (2013.01)
(58) Field of Classification Search
  CPC ...... F01D 11/005; F01D 17/16; F01D 17/165; F01D 25/162; F01D 25/246; F05D 2220/40; F05D 2260/231; F02B 37/24
  USPC .......................................................... 415/164
  See application file for complete search history.

(56) References Cited

U.S. PATENT DOCUMENTS

| | | | |
|---|---|---|---|
| 7,021,057 B2* | 4/2006 | Sumser | F01D 17/165 415/163 |
| 8,333,556 B2* | 12/2012 | Hettinger | F01D 17/165 415/165 |
| 2010/0247296 A1 | 9/2010 | Matsuyama | |
| 2010/0310363 A1 | 12/2010 | Matsuyama et al. | |
| 2012/0263585 A1 | 10/2012 | Matsuyama | |
| 2014/0321990 A1 | 10/2014 | Ikegami et al. | |
| 2015/0260288 A1 | 9/2015 | Matsuyama | |
| 2016/0090858 A1* | 3/2016 | Barthelet | F01D 17/16 417/406 |
| 2016/0245160 A1* | 8/2016 | Ueda | F02B 37/24 |
| 2016/0258316 A1* | 9/2016 | Ueda | F02B 37/24 |
| 2016/0265388 A1* | 9/2016 | Annati | F01D 25/26 |
| 2017/0082018 A1* | 3/2017 | Bayod | F02B 37/22 |

FOREIGN PATENT DOCUMENTS

| | | |
|---|---|---|
| JP | 2006-125588 A | 5/2006 |
| JP | 2009-144545 A | 7/2009 |
| JP | 2009-144546 A | 7/2009 |
| JP | 2013-2293 A | 1/2013 |
| JP | 2013-15100 A | 1/2013 |
| JP | 2013-104412 A | 5/2013 |
| JP | 2013-104414 A | 5/2013 |
| JP | 2013-253521 A | 12/2013 |
| JP | 5402682 B2 | 1/2014 |

* cited by examiner

VARIABLE NOZZLE UNIT AND VARIABLE-CAPACITY SUPERCHARGER

TECHNICAL FIELD

The present disclosure relates to a variable nozzle unit and a variable-capacity supercharger.

BACKGROUND ART

In variable-capacity superchargers, a variable nozzle unit is provided between a turbine scroll channel and a turbine wheel (a turbine impeller) in a turbine housing. The variable nozzle unit is provided at an outer circumferential side of the turbine wheel in the turbine housing. The variable nozzle unit is generally provided with first and second nozzle rings that are provided to be apart from each other in an axial direction of the turbine wheel, and a plurality of variable nozzles that are sandwiched between the first nozzle ring and the second nozzle ring and are disposed at equal intervals in a circumferential direction. The first nozzle ring is provided at a bearing housing side in the axial direction of the turbine wheel relative to the turbine wheel. The second nozzle ring is disposed to surround an outer circumference of the turbine wheel. The pluralities of variable nozzles have nozzle shafts extending in the axial direction of the turbine wheel, and the nozzle shafts are rotatably supported by the first and second nozzle rings. In the variable nozzle unit having the above constitution, the plurality of variable nozzles are synchronized and rotated in an opening direction, and thereby a channel area of an exhaust gas supplied to the turbine wheel side can be increased. The plurality of variable nozzles are synchronized and rotated in a narrowing direction, and thereby the channel area of the exhaust gas can be increased. In this way, in the variable-capacity supercharger, the channel area is changed to control a supercharging pressure by the variable nozzles. Thereby, supercharging efficiency can be properly maintained.

In this variable-capacity supercharger, for the purpose of improving the supercharging efficiency, various constitutions for preventing leakage of the exhaust gas have been reviewed. For example, in Patent Literature 1, a seal cover is provided at a rear surface side of the second nozzle ring which is opposite to a surface facing the first nozzle ring. Thus, a constitution for preventing leakage of the exhaust gas from the turbine scroll channel to an outlet side of the turbine wheel is suggested.

CITATION LIST

Patent Literature

Patent Literature 1: Japanese Unexamined Patent Publication No. 2013-2293

SUMMARY

Technical Problem

In recent years, development of a diesel engine coping with low fuel and a low environmental load has proceeded, and a variable-capacity supercharger that can be applied to this diesel engine is also requested to reduce a size and increase output.

The present disclosure describes a variable nozzle unit and a variable-capacity supercharger in which supercharging efficiency is further improved.

Solution to Problem

To achieve the object, a variable nozzle unit according to an aspect of the present disclosure is a variable nozzle unit that is disposed between a turbine scroll channel and a turbine wheel inside a turbine housing in a variable-capacity supercharger and changes a channel area of an exhaust gas supplied from the turbine scroll channel to the turbine wheel, and includes: a first nozzle ring disposed inside the turbine housing and formed with a plurality of first support holes; a second nozzle ring disposed to face the first nozzle ring at a position spaced apart from the first nozzle ring in an axial direction of the turbine wheel and formed with a plurality of second support holes that are through-holes corresponding to the first support holes; a plurality of variable nozzles rotatably supported by the first nozzle ring and the second nozzle ring; and a plurality of seal members disposed between the turbine scroll channel and the turbine wheel along a surface of the second nozzle ring which faces the turbine housing. The variable nozzles include first nozzle shafts that extend to one sides thereof and are rotatably supported by the first support holes, and second nozzle shafts that extend to the other sides thereof and are rotatably supported by the second support holes, and a first seal member included in the plurality of seal members is provided at the turbine wheel side relative to the second support holes.

Effects

According to the present disclosure, a variable nozzle unit and a variable-capacity supercharger in which supercharging efficiency is further improved are provided.

DESCRIPTION OF EMBODIMENTS

Figure 1:
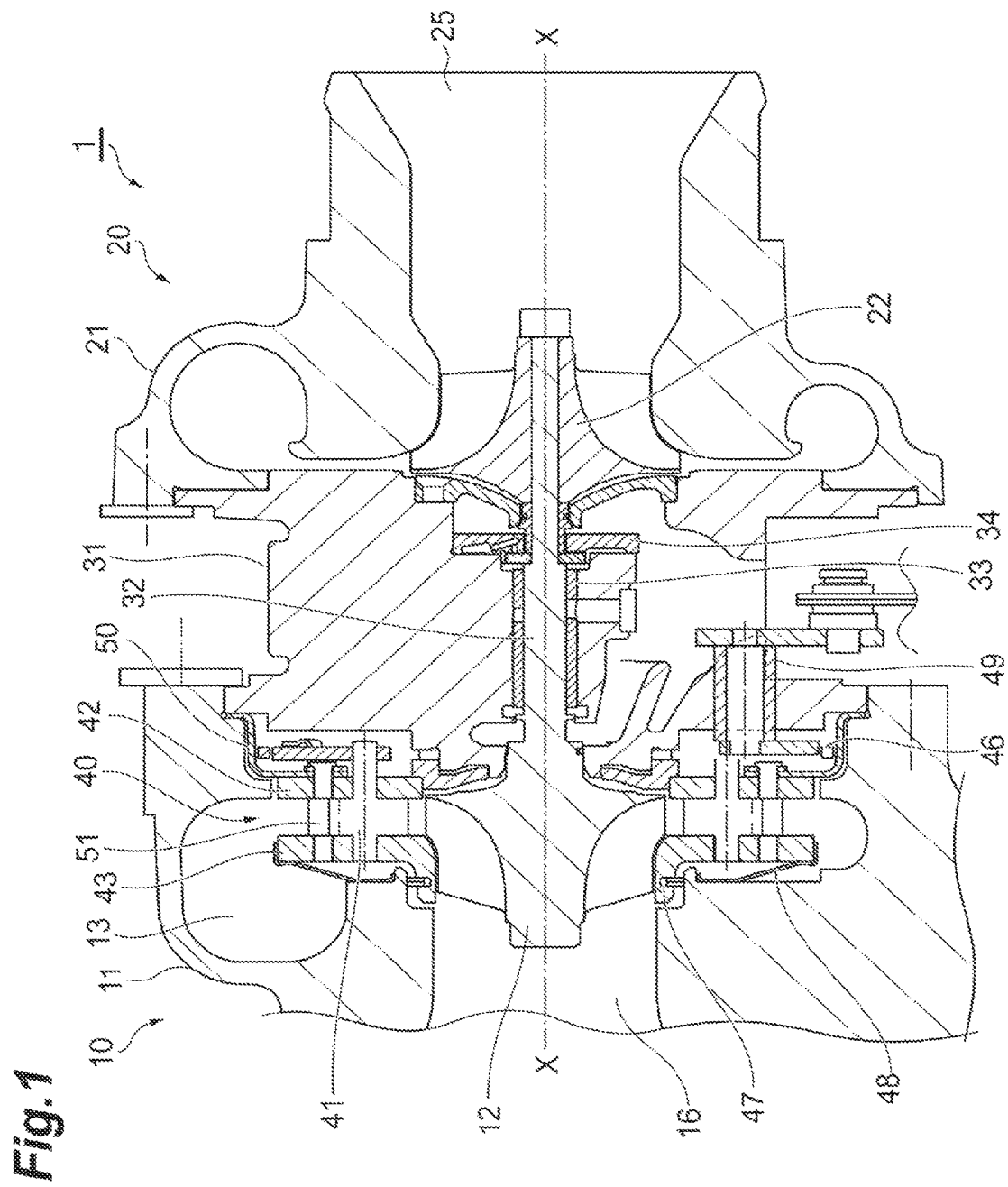
FIG. 1 is a schematic constitution view of a variable-capacity supercharger according to a first embodiment.

A variable nozzle unit according to an aspect of the present disclosure is a variable nozzle unit that is disposed between a turbine scroll channel and a turbine wheel inside a turbine housing in a variable-capacity supercharger and changes a channel area of an exhaust gas supplied from the turbine scroll channel to the turbine wheel, and includes: a first nozzle ring disposed inside the turbine housing and formed with a plurality of first support holes; a second nozzle ring disposed to face the first nozzle ring at a position spaced apart from the first nozzle ring in an axial direction of the turbine wheel and formed with a plurality of second support holes that are through-holes corresponding to the first support holes; a plurality of variable nozzles rotatably supported by the first nozzle ring and the second nozzle ring; and a plurality of seal members disposed between the turbine scroll channel and the turbine wheel along a surface of the second nozzle ring which faces the turbine housing. The variable nozzles include first nozzle shafts that extend to one sides thereof and are rotatably supported by the first support holes, and second nozzle shafts that extend to the other sides thereof and are rotatably supported by the second support holes, and a first seal member included in the plurality of seal members is provided at the turbine wheel side relative to the second support holes.

According to the variable nozzle unit, the plurality of seal members are provided between the turbine scroll channel and the turbine wheel side on the surface of the second nozzle ring which faces the turbine housing. First, the plurality of seal members are provided, and thereby formation of a flow of an exhaust gas going through the surface side facing the turbine housing can be prevented. The first seal member that is one of the plurality of seal members is provided at the turbine wheel side relative to the second support holes, and thereby an exhaust gas channel directed directly from the turbine scroll channel to the turbine wheel side is blocked. In addition to this, the formation of the flow of the exhaust gas directed downstream from the turbine wheel side from the surface side facing the turbine housing via the second support holes of the second nozzle ring can be prevented. As a result, since a flow rate of the exhaust gas passing through the variable nozzles can be increased, supercharging efficiency is improved.

Here, a mode in which a second seal member included in the plurality of seal members is provided at the turbine scroll channel side relative to the second support holes may be provided.

The second seal member is configured to be provided at the turbine scroll channel side relative to the second support holes. Thereby, movement of the exhaust gas can be inhibited at the surface side facing the second nozzle ring and the turbine housing, and the exhaust gas can be properly guided into the variable nozzles. Further, since a closed space is formed around the second support holes into which the second nozzle shafts are inserted on a rear surface (a surface opposite to the surface facing the first nozzle ring) of the second nozzle ring, the flow of the exhaust gas directed to the space via the second support holes can be inhibited, and the supercharging efficiency can be prevented from being further reduced.

A variable-capacity supercharger according to an aspect of the present disclosure is a variable-capacity supercharger including the above variable nozzle unit, and may provide a mode in which the turbine housing includes a shroud part, an inner circumferential surface of which faces a blade end of the turbine wheel and which has a shape following a shape of the blade end, at an inner circumferential side thereof relative to the second nozzle ring.

The mode in which the turbine housing includes the shroud part is provided, and thereby a boundary continuing from the rear surface of the second nozzle ring between the second nozzle ring and the turbine housing can be provided upstream from the turbine wheel. For this reason, even if the flow of the exhaust gas is formed at the rear surface side of the second nozzle ring, an outlet thereof is located upstream from the turbine wheel. Thereby, the flow of the exhaust gas of the rear surface side can also contribute to rotation of the turbine wheel. Therefore, the supercharging efficiency can be further improved.

A variable-capacity supercharger according to an aspect of the present disclosure is a variable-capacity supercharger including the above variable nozzle unit, and may provide a mode in which the second seal member is in contact with the turbine housing at an inner circumferential side thereof, is in contact with the second nozzle ring at an outer circumferential side thereof, and is in the shape of a disc spring pressing the second nozzle ring.

The disc-spring-shaped seal member is adopted as the second seal member. Thereby, a sealing characteristic for blocking a clearance formed between the turbine scroll channel and the turbine wheel is enhanced, and thus the supercharging efficiency can be improved.

In the variable-capacity supercharger, a mode in which the first nozzle ring and the second nozzle ring are fixed by coupling pins, and an inner circumferential end of a contact part of the second seal member with the second nozzle ring is located outside in a radial direction relative to mounted positions of the coupling pins may be provided.

As the inner circumferential end of the contact part of the second seal member with the second nozzle ring is located outside in the radial direction relative to the mounted positions of the coupling pins, the second seal member and the second nozzle ring can be brought into contact with each other by avoiding a step or the like that can be formed in the surface of the second nozzle ring. Therefore, the sealing characteristic for the clearance formed between the turbine scroll channel and the turbine wheel side can be enhanced.

A variable-capacity supercharger according to an aspect of the present disclosure is a variable-capacity supercharger including a variable nozzle unit that is disposed between a turbine scroll channel and a turbine wheel inside a turbine housing and changes a channel area of an exhaust gas supplied from a turbine scroll channel to a turbine wheel side, in which the variable nozzle unit includes: a first nozzle ring disposed inside the turbine housing and formed with a plurality of first support holes; a second nozzle ring disposed to face the first nozzle ring at a position spaced apart from the first nozzle ring in an axial direction of the turbine wheel and formed with a plurality of second support holes that are through-holes corresponding to the first support holes; a plurality of variable nozzles rotatably supported by the first nozzle ring and the second nozzle ring; and a plurality of seal members disposed along a surface of the second nozzle ring which faces the turbine housing between the turbine scroll channel and the turbine wheel side. The variable nozzles include first nozzle shafts that extend to one sides thereof and are rotatably supported by the first support holes, and second nozzle shafts that extend to the other sides thereof and are rotatably supported by the second support holes, and a first seal member included in the plurality of seal members is provided at the turbine wheel side relative to the second support holes. A second seal member included in the plurality of seal members is provided at the turbine scroll channel side relative to the second support holes, is in contact with the turbine housing at an inner circumferential side thereof, is in contact with the second nozzle ring at an outer circumferential side thereof, and is in the shape of a disc spring pressing the second nozzle ring, and the turbine housing has a groove part allowing insertion of an inner circumferential end of the second seal member.

The constitution in which the inner circumferential end of the seal cover can be inserted into the groove part of the turbine housing is provided. Thereby, even if the seal cover is deformed by heat or a fluid load during operation of the variable-capacity supercharger, the inner circumferential end of the seal cover can be fitted into the groove part.

Thereby, additional deformation of the seal cover can be prevented. Therefore, the sealing characteristic for the clearance formed between the turbine scroll channel and the turbine wheel side can be enhanced.

Hereinafter, a mode for carrying out the present disclosure will be described with reference to the drawings. In the description of the drawings, the same elements are given the same signs, and duplicate description will be omitted.

(First embodiment)

A variable-capacity supercharger according to a first embodiment of the present disclosure will be described with reference to FIGS. 1 to 3. As illustrated in FIG. 1, a variable-capacity supercharger 1 according to a first embodiment is provided with a turbine 10 and a compressor (a centrifugal compressor) 20. The turbine 10 is provided with a turbine housing 11 and a turbine wheel 12 housed in the turbine housing 11. The compressor 20 is provided with a compressor housing 21 and a compressor wheel 22 housed in the compressor housing 21. The turbine wheel 12 is provided at one end of a rotary shaft 32 extending in a direction of an axis X, and the compressor wheel 22 is provided at the other end of the rotary shaft 32. A bearing housing 31 is provided between the turbine housing 11 and the compressor housing 21. The rotary shaft 32 is rotatably supported by the bearing housing 31. The rotary shaft 32, the turbine wheel 12, and the compressor wheel 22 are rotated as an integrated rotator.

The turbine housing 11 is provided with an exhaust gas inlet (not shown) and an exhaust gas outlet 16. An exhaust gas discharged from an internal combustion engine (not shown) flows into a spiral turbine scroll channel 13 installed in the turbine housing 11 through the exhaust gas inlet (not shown), rotates the turbine wheel 12, and then flows out of the turbine housing 11 through the exhaust gas outlet 16. A variable nozzle unit 40 for controlling a channel area (a flow rate) of the exhaust gas supplied to the turbine wheel 12 side is installed in the turbine housing 11. This point will be described below. In description of the following embodiment, with regard to a flow of the exhaust gas inside the turbine housing 11, the turbine scroll channel 13 side close to the exhaust gas inlet will sometimes be defined as "upstream," and the turbine wheel 12 side close to the exhaust gas outlet 16 as "downstream."

The compressor housing 21 is provided with a suction port 25 and a discharge port (not shown). As described above, when the turbine wheel 12 is rotated, the compressor wheel 22 rotates via the rotary shaft 32. Depending on the rotation of the compressor wheel 22, open air is suctioned via the suction port 25, and is discharged from the discharge port through a compressor scroll channel The compressed air discharged from the discharge port is supplied to the aforementioned internal combustion engine.

The bearing housing 31 is provided with a radial bearing 33 and a pair of thrust bearings 34 that rotatably support the rotary shaft 32.

Next, the variable nozzle unit 40 contained in the turbine housing 11 will be described with reference to FIGS. 1 to 3.

The variable nozzle unit 40 has a plurality of variable nozzles 41 disposed at intervals in a circumferential direction centered on an axis X, first and second nozzle rings 42 and 43 that hold these variable nozzles 41 in such a manner that the variable nozzles 41 are sandwiched in the direction of the axis X, a plurality of link members 45 that are fixed to the plurality of variable nozzles 41 and extend outward in a radial direction, a drive ring 46 that is engaged with outer ends of the link members 45 in the radial direction, and a seal ring (a first seal member) 47 and a seal cover (a second seal member) 48 for inhibiting leakage of the exhaust gas. As can be seen from FIG. 1, this variable nozzle unit 40 is mounted outside the turbine wheel 12 in the radial direction such that the plurality of variable nozzles 41 are arranged with respect to an exhaust gas channel directed from the turbine scroll channel 13 toward the turbine wheel 12 side.

In the variable nozzle unit 40, as driving of a motor or a cylinder (not shown) is transmitted via a transmission 49, a drive ring 46 is rotated in a circumferential direction, and thereby a plurality of link members 45 engaged with the drive ring 46 are rotated. Thereby, the plurality of variable nozzles 41 fixed to the plurality of link members 45 are rotated (oscillated). The variable nozzle unit 40 controls amounts of rotation of the plurality of variable nozzles 41, thereby making it possible to control the flow rate of the exhaust gas from the upstream turbine scroll channel 13 side to the downstream turbine wheel 12 side.

Next, each part of the variable nozzle unit 40 will be described with reference to FIGS. 2 and 3. The first nozzle ring 42 is provided outside the turbine wheel 12 in the radial direction at a position that becomes the bearing housing 31 side with respect to blade ends 12a of the turbine wheel 12. The first nozzle ring 42 is disposed to face the second nozzle ring 43 (to be described below) in the direction of the axis X. The first nozzle ring 42 has first support holes 61 that are a plurality of through-holes provided at intervals in the circumferential direction centered on the axis X. The first support holes 61 are through-holes for supporting the variable nozzles 41.

The first nozzle ring 42 is fixed to a support ring 50, an outer diameter of which is larger than the first nozzle ring 42, at the bearing housing 31 side (the rear surface side) of the first nozzle ring 42. An outer periphery of the support ring 50 is sandwiched by the turbine housing 11 and the bearing housing 31. Thereby, the support ring 50 and the first nozzle ring 42 fixed to the support ring 50 are fixed to the turbine housing 11 and the bearing housing 31.

A heat insulating board 52, which is of an approximately annular shape and is for insulating heat propagated from the turbine 10 side, is provided on an inner circumferential side of the first nozzle ring 42 at a position that faces a rear surface (a surface of the bearing housing side) of the turbine wheel 12. As illustrated in FIG. 2, an inner periphery of the heat insulating board 52 surrounds the bearing housing 31. A cutout 52a is formed in an outer periphery of the heat insulating board 52, and the outer periphery of the heat insulating board 52 is in contact with an inner periphery of the first nozzle ring 42 at this cutout 52a. Thereby, heat is inhibited from propagating from the turbine 10 side to the bearing housing 31 side and the compressor 20 side. A wave washer 53 is provided between an outer circumferential side of the heat insulating board 52 and the bearing housing 31, and the heat insulating board 52 is pressed to the first nozzle ring 42 side by the wave washer 53. In this way, the heat insulating board 52 and the wave washer 53 support the first nozzle ring 42 from the bearing housing 31 side. The wave washer 53 forms a waveform when viewed from the side, and has a portion that is in contact with the bearing housing 31 and a portion that is in contact with the heat insulating board 52. An interval between these portions is secured, and elasticity is adjusted. Thereby, the heat insulating board 52 and the first nozzle ring 42 are prevented from being deformed by a spring force caused by the wave washer 53. The first nozzle ring 42 is configured to be pressed to the second nozzle ring 43 via the heat insulating board 52 by the wave washer 53, and thereby a sealing characteristic between the first nozzle ring 42 and the second nozzle ring 43 is improved.

The second nozzle ring 43 is provided to be separated from the first nozzle ring 42 in the direction of the axis X. The first nozzle ring 42 and the second nozzle ring 43 are connected in a state in which they are separated at a given distance by a plurality of coupling pins 51 arranged at intervals in the circumferential direction centered on the axis X. The second nozzle ring 43 has second support holes 62 that are a plurality of through-holes provided at intervals in the circumferential direction centered on the axis X in correspondence to the plurality of first support holes 61 in the first nozzle ring 42.

A shroud part 44 extending to the exhaust gas outlet 16 side in the direction of the axis X is formed at an inner circumferential end of the annular second nozzle ring 43. An inner circumferential surface 44a of the shroud part 44 faces the blade end 12a of the turbine wheel 12, and has a shape following a shape of the blade end 12a An outer circumferential surface 44b of the shroud part 44 faces an inner circumferential surface 11a of the turbine housing 11. The inner circumferential surface 11a is a surface that is cut out and formed according to a shape of the shroud part 44 with respect to a channel extending from the turbine wheel 12 toward the exhaust gas outlet 16 side. Thereby, the second nozzle ring 43 faces the turbine housing 11 on the rear surface 43b and the outer circumferential surface 44b of the shroud part 44. A boundary portion between the second nozzle ring 43 and the turbine housing 11 at the inner circumferential end of the outer circumferential surface 44b of the shroud part 44 of the second nozzle ring 43 is provided downstream (toward the exhaust gas outlet 16) from the blade end 12a of the turbine wheel 12.

The seal ring 47 is provided between the inner circumferential surface 11a of the turbine housing 11 and the second nozzle ring 43.

The seal ring 47 is one of the seal members provided to prevent communication between the turbine wheel 12 and the rear surface 43b side that is opposite to a facing surface 43a of the second nozzle ring 43 which is on the variable nozzles 41 side. A metal material having heat resistance can be used as the seal ring 47, but a material and shape of the seal ring 47 may be appropriately modified such that a joint gap is made smaller during operation. The number of seal rings 47 may also be appropriately modified depending on an operation situation or the like. As illustrated in FIG. 3, the seal ring 47 in the present embodiment is housed in a groove 44c formed in the outer circumferential surface 44b of the shroud part 44. Thereby, the seal ring 47 is disposed to block between the inner circumferential surface 11a of the turbine housing 11 and the outer circumferential surface 44b of the shroud part 44 in the second nozzle ring 43. That is, the seal ring 47 is provided at the turbine wheel 12 side relative to the second support holes 62.

A step surface 11c facing the rear surface 43b in the second nozzle ring 43 is provided between the inner circumferential surface 11a of the turbine housing 11 provided to face the outer circumferential surface 44b of the shroud part 44 of the second nozzle ring 43 and an inner wall portion of the turbine scroll channel 13. The step surface 11c is formed apart from the rear surface 43b of the second nozzle ring 43. An outer circumferential surface 11b that is continuous with the inner circumferential surface 11a and the step surface 11c is formed between the step surface 11c and the inner circumferential surface 11a. The seal cover 48 is provided between the outer circumferential surface 11b and the step surface 11c and the rear surface 43b of the second nozzle ring 43.

The seal cover 48 is one of the seal members provided to prevent communication between the rear surface 43b side of the second nozzle ring 43 and the turbine wheel 12. The seal cover 48 can be formed, for example, by bending an annular sheet metal. A metal material, for example stainless steel such as SUS304 or SUS310, may be appropriately selected as the seal cover 48.

The seal cover 48 is provided with a support part 48a that is in contact with the step surface 11c of the turbine housing 11, an oblique part 48b that is formed at an outer circumferential side of the support part 48a, is bent with respect to the support part 48a, and is inclined toward the second nozzle ring 43 side, a ring contact part 48c that is bent with respect to the oblique part 48b at an outer circumferential side of the oblique part 48b and is in contact with the rear surface 43b of the second nozzle ring 43, and a ring support part 48d that is formed at an outer circumferential side of the ring contact part 48c and is in contact with an outer periphery 43d of the second nozzle ring 43. As illustrated in FIG. 3, the seal cover 48 is in contact with the step surface 11c of the turbine housing 11 at the support part 48a, and is in contact with the second nozzle ring 43 at the ring contact part 48c and the ring support part 48d. In this state, the seal cover 48 is supported between the turbine housing 11 and the second nozzle ring 43. Thereby, the space between the turbine scroll channel 13 side and the turbine wheel 12 is blocked by the seal cover 48 at the turbine scroll channel 13 side relative to the second support holes 62.

Figure 3:
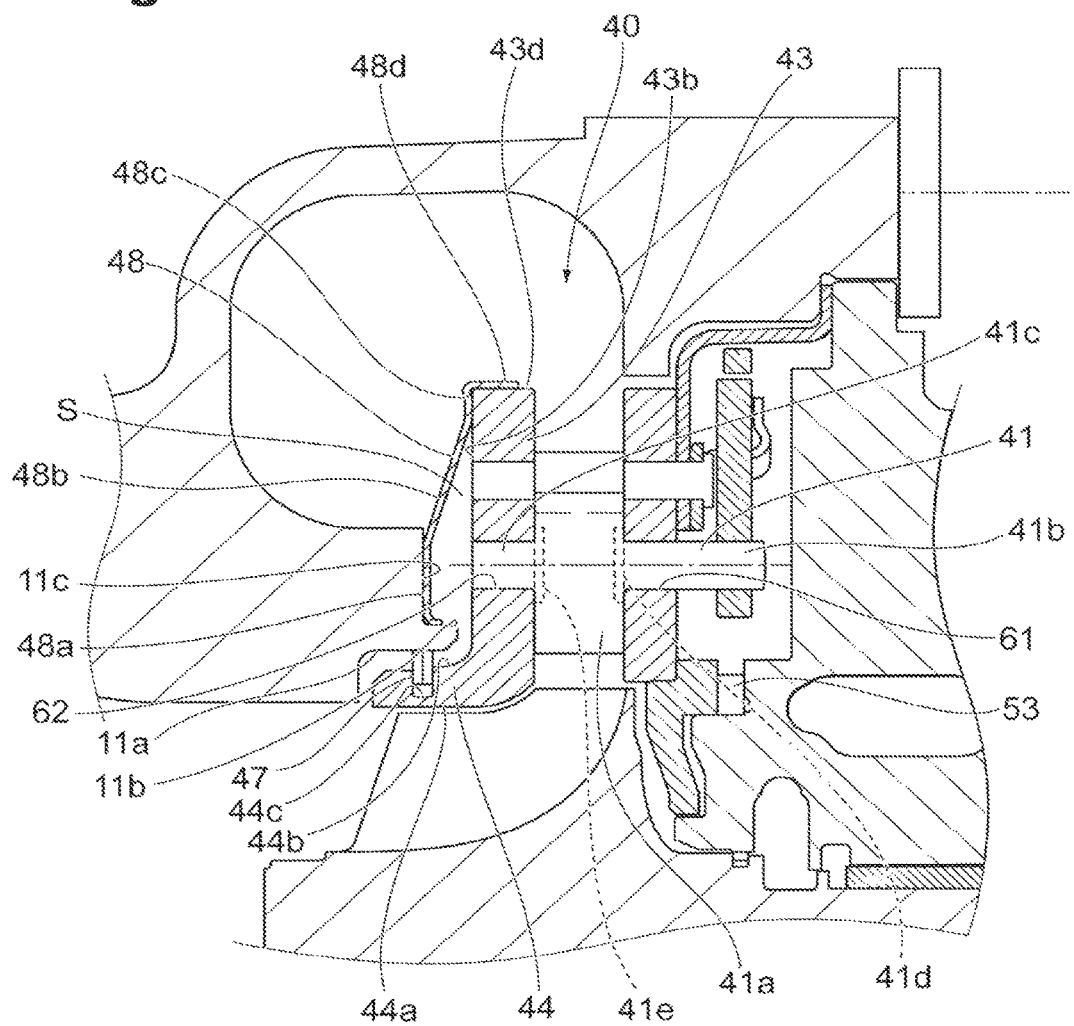
FIG. 3 is an enlarged view of the vicinity of a variable nozzle in FIG. 2.

As illustrated in FIG. 3, the oblique part 48b is formed at the seal cover 48 between the support part 48a of an inner circumferential side and the ring contact part 48c of an outer circumferential side. Thereby, the seal cover 48 functions as a disc spring supporting the second nozzle ring 43. In the seal cover 48 shown in the present embodiment, a seal cover 48 having the shape of the disc spring is adopted, and thereby a sealing characteristic for a clearance formed between the turbine scroll channel 13 side and the turbine wheel 12 is improved. The oblique part 48b is configured to secure a longer length than a conventional seal cover 48, and the ring contact part 48c is configured to be in contact with an outer circumferential side of the second nozzle ring 43. Thereby, an elastic force of the disc spring is controlled such that a spring force applied to the second nozzle ring 43 is not excessively increased. With this constitution, the variable nozzle unit 40 including the second nozzle ring 43 can be prevented from being thermally deformed by receiving the spring force under a high-temperature environment, for instance, during operation.

The ring support part 48d formed at an outer circumferential end of the seal cover 48 to continue from the ring contact part 48c is mounted to surround the second nozzle ring 43 from the outside. Thereby, support of performance of the second nozzle ring 43 caused by the seal cover 48 is enhanced. The ring support part 48d need not surround the outside of the second nozzle ring 43 over the entire circumference, and an appropriate clearance or the like may be provided. Even in this case, in comparison with a case in which the ring support part 48d is not provided, the support of performance of the second nozzle ring 43 caused by the seal cover 48 is improved.

The second nozzle ring 43 sides (the other sides) of the coupling pins 51 are fixed to the rear surface 43b side of the second nozzle ring 43, for example, by swaging, but a case in which a slight step occurs between each of end faces of the other sides of the coupling pins 51 and the rear surface 43b is conceivable. That is, there is a possibility of a step being formed on a surface of the second nozzle ring 43 which is on the rear surface 43b side. Here, as illustrated in FIG. 3, the seal cover 48 is configured such that an inner circumferential end of the ring contact part 48c is located outside the coupling pins 51 in a radial direction. Thereby, on the rear surface 43b of the second nozzle ring 43, a step between the rear surface 43b and the end faces of the coupling pins 51 is avoided, and the ring contact part 48c can be in contact with the outer circumferential side of the second nozzle ring 43. Therefore, a flow of the exhaust gas leaking to the rear surface 43b side of the second nozzle ring 43 is prevented and, in comparison with the case in which the seal cover 48 is in contact with the step between the rear surface 43b and the end faces of the coupling pins 51, the sealing characteristic for the clearance formed between the turbine scroll channel 13 and the turbine wheel 12 side can be further improved.

In this way, to prevent the turbine scroll channel 13 and the turbine wheel 12 side from communicating with each other on the rear surface 43b of the second nozzle ring 43 and the shroud part 44 side of the inner circumferential side, the two seal members, that is, the seal ring 47 and the seal cover 48, are mounted. Thereby, the exhaust gas flowing along the turbine scroll channel 13 passes through the variable nozzle 41 sides of the facing surface 43a side of the second nozzle ring 43, and flows into the turbine wheel 12 side.

Figure 2:
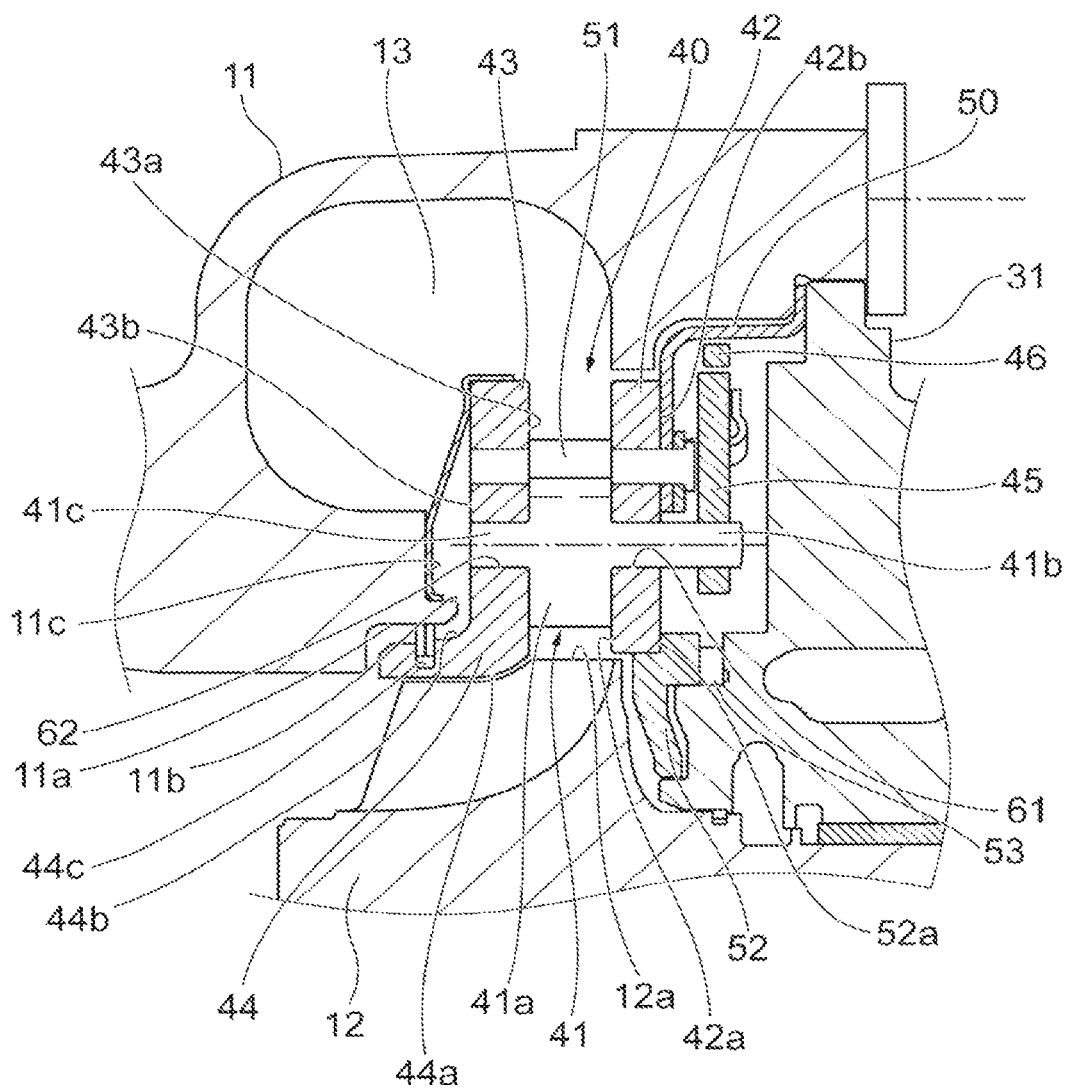
FIG. 2 is a sectional view illustrating a variable nozzle unit in the variable-capacity supercharger according to the first embodiment.

As illustrated in FIG. 2, since there is a clearance between the outer periphery of the first nozzle ring 42 and the turbine housing 11 at the first nozzle ring 42 side, the exhaust gas can flow into the rear surface 42b side of the first nozzle ring 42. However, because the heat insulating board 52 and the wave washer 53 are provided between the rear surface 42b side of the first nozzle ring 42 and the turbine wheel 12 side (see FIG. 2), and communication therebetween is prevented, inflow of the exhaust gas from the rear surface 42b side is regulated.

The plurality of variable nozzles 41 are provided between the first nozzle ring 42 and the second nozzle ring 43. Each of the variable nozzles 41 is provided with a tabular nozzle part 41a that is provided on the exhaust gas channel between the turbine scroll channel 13 side and the turbine wheel 12 side and is rotatable about a shaft center parallel to the axis X, and first and second nozzle shafts 41b and 41c that constitute the rotating shaft center of the nozzle part 41a. Among them, the first nozzle shafts 41b are shafts extending from the nozzle parts 41a to the first nozzle ring 42 side (one side), and are inserted into and rotatably supported in the first support holes 61 of the first nozzle ring 42. Moreover, the first nozzle shafts 41b are fixed to the link members 45 at the bearing housing 31 side (the rear surface side) of the first nozzle ring 42. On the other hand, the second nozzle shafts 41c are shafts extending from the nozzle parts 41a to the second nozzle ring 43 side (the other side), and are inserted into and rotatably supported in the second support holes 62 of the second nozzle ring 43. The first nozzle shafts 41b and the second nozzle shafts 41c extend on the same center. That is, the variable nozzles 41 are so-called straddled variable nozzles that are rotatably supported from both sides by the first and second nozzle rings 42 and 43 disposed across the nozzle parts 41a in the direction of the axis X.

As illustrated in FIG. 3, root portions (ends of the nozzle parts 41a sides) of the first nozzle shafts 41b in the variable nozzles 41 are provided with first flange parts 41d that protrude outward from the first nozzle shafts 41b along the facing surfaces 42a of the variable nozzles 41 sides in the first nozzle ring 42 and can be brought into contact with the facing surfaces 42a. Root portions (ends of the nozzle parts 41a sides) of the second nozzle shafts 41c in the variable nozzles 41 are provided with second flange parts 41e that protrude outward from the second nozzle shafts 41c along the facing surfaces 43a of the variable nozzles 41 sides in the second nozzle ring 43 and can be brought into contact with the facing surfaces 43a. As the first flange parts 41d and the second flange parts 41e are provided, misalignment of rotating shafts of the variable nozzles 41 caused by an exhaust gas pressure or the like against the nozzle parts 41a of the variable nozzles 41 can be prevented. The first flange parts 41d and the second flange parts 41e may not be provided.

Here, in the variable-capacity supercharger 1 including the variable nozzle unit 40 according to the present embodiment, the seal ring (the first seal member) 47 and the seal cover (the second seal member) 48 are provided as the two seal members. These members can inhibit circulation of the exhaust gas from the rear surface 43b of the second nozzle ring 43 and the outer circumferential surface 44b side of the shroud part 44 of the inner circumferential side. Thereby, performance of the entire supercharger is improved. This point will be described with reference to FIGS. 3 and 4.

Figure 4:
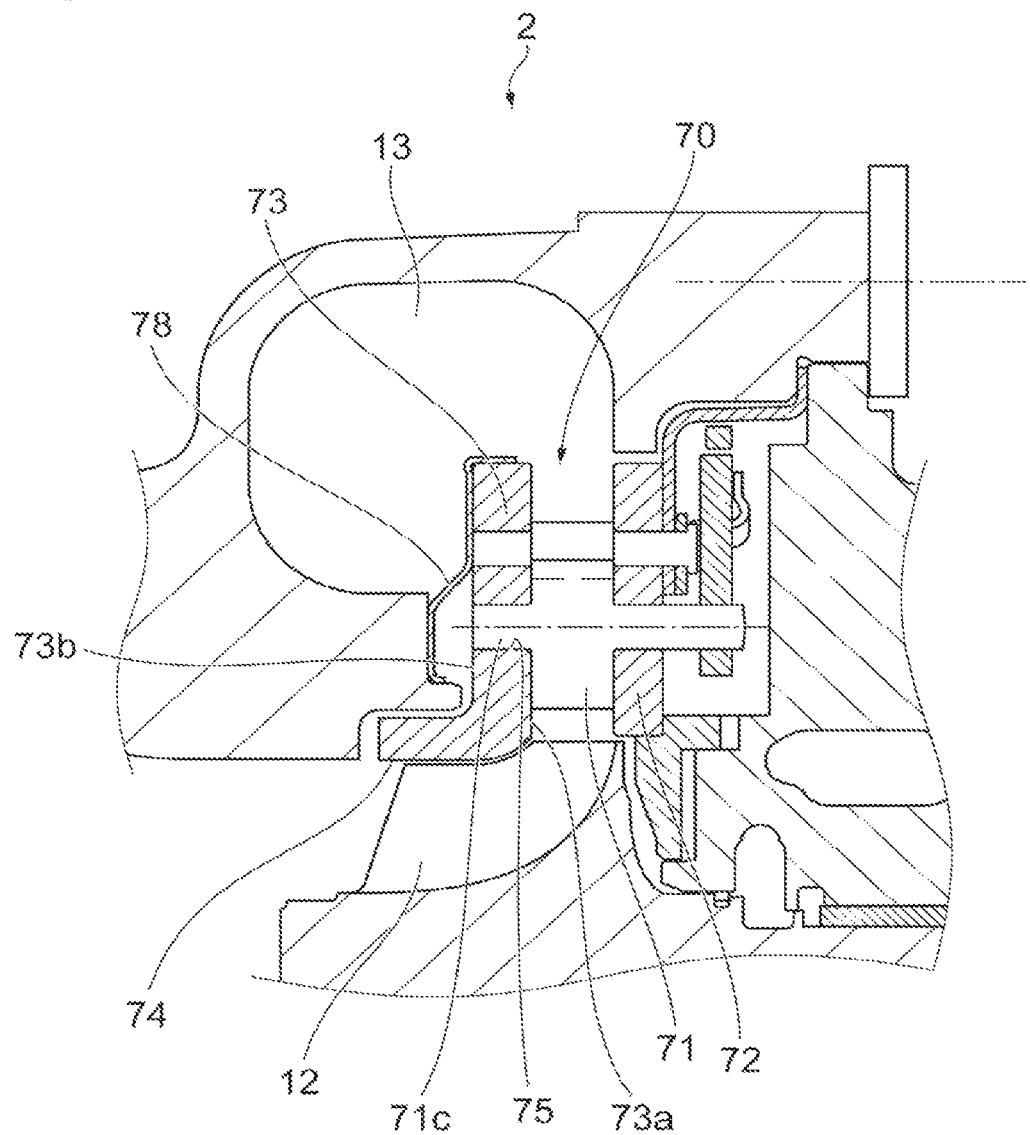
FIG. 4 is a sectional view illustrating a variable nozzle unit in a conventional variable-capacity supercharger.

FIG. 4 is a sectional view of a conventional variable-capacity supercharger, and corresponds to FIG. 2. In the variable-capacity supercharger 2 illustrated in FIG. 4, a structure of a variable nozzle unit 70 is partly different from that of the variable nozzle unit 40 of the variable-capacity supercharger 1 according to the present embodiment. For example, the variable nozzle unit 70 is different from the variable nozzle unit 40 in that a seal member corresponding to a seal ring 47 is not provided between an outer circumferential surface of a shroud part 74 of a second nozzle ring 73 and the turbine housing.

In the conventional variable-capacity supercharger 2, a seal cover 78 is provided, and thereby an exhaust gas channel directed directly from a turbine scroll channel 13 to a turbine wheel 12 side via a rear surface 73b side of the second nozzle ring 73 is blocked. However, since a clearance for securing a rotating characteristic of nozzles is secured between the second nozzle ring 73 and surroundings of second nozzle shafts 71c of variable nozzles 71 mounted on the second nozzle ring 73, it is conceivable that a flow of an exhaust gas via second support holes 75 supporting the second nozzle shafts 71c may occur. In this case, the exhaust gas from the turbine scroll channel 13 is directed from a facing surface 73a side of the second nozzle ring 73 to the rear surface 73b side via the second support holes 75, and flows from a space between the shroud part 74 and the turbine housing 11 to a channel of the turbine wheel 12 side along the rear surface 73b side. In this case, when the flow of the exhaust gas not passing through the variable nozzles 71 occurs, since flow rate control using the variable nozzles 71 cannot be applied to the whole exhaust gas, it is conceivable that performance of the entire variable-capacity supercharger may not be sufficiently exhibited. Since foreign materials such as soot are included in the exhaust gas, when the exhaust gas also flows out to the second support holes 75 and the rear surface 73b side of the second nozzle ring 73, it is conceivable that the foreign materials such as soot may also adhere to the rear surface 73b side and an outer circumferential side of the shroud part 74. In this case, it is conceivable that a reduction in performance caused by the adhesion of the foreign materials (for example, a reduction in operability of the variable nozzles) may occur.

In contrast, in the variable-capacity supercharger 1 including the variable nozzle unit 40 according to the present embodiment, the plurality of seal members are provided between the turbine scroll channel 13 and the turbine wheel 12 side at the rear surface 43b side of the second nozzle ring 43 and the outer circumferential surface 44b side of the shroud part 44. Because the plurality of seal members are provided, formation of the flow of the exhaust gas going through the rear surface 43b side of the second nozzle ring 43 and the outer circumferential surface 44b side of the shroud part 44 can be prevented. The variable-capacity supercharger 1 including the variable nozzle unit 40 according to the present embodiment is characterized in that the seal ring 47 that is one of the plurality of seal members is provided downstream (toward the turbine wheel 12) from the second support holes 62 of the second nozzle ring 43. Because the seal cover 48 is provided, the exhaust gas channel directed directly from the turbine scroll channel 13 to the turbine wheel 12 side is blocked. In addition to this, the seal ring 47 is provided, and thereby the occurrence of the flow of the exhaust gas directed downstream from the turbine wheel 12 side from the rear surface 43b side via the second support holes 62 of the second nozzle ring 43 can be prevented. As a result, since the flow rate of the exhaust gas passing through the variable nozzles 41 can be increased, supercharging efficiency is improved.

With respect to the second support holes 62 into which the second nozzle shafts 41c are inserted, the seal cover 48 is provided upstream (toward a turbine scroll channel 13) therefrom, and the seal ring 47 is provided downstream (toward the turbine wheel 12) therefrom. Both the seal ring 47 and the seal cover 48 are provided, and thereby a space S (see FIG. 3) surrounded by the seal ring 47, the seal cover 48, and the turbine housing 11 on the rear surface 43b of the second nozzle ring 43 and the outer circumferential surface 44b of the shroud part 44 is formed around the second support holes 62 into which the second nozzle shafts 41c are inserted. Since a pressure inside the space S is nearly the same as that of the nozzle part 41a sides connected by the second support holes 62, the exhaust gas is inhibited from flowing into the space S via the second support holes 62. In comparison which the case in which the seal cover 48 is not provided, since the rear surface 43b of the second nozzle ring 43 is not exposed to the turbine scroll channel 13, the adhesion or the like of the foreign materials caused by coining into contact with the exhaust gas prior to passing through the variable nozzles 41 can be prevented. As a result, a reduction in supercharging efficiency caused by a reduction in operability of the variable nozzles can be prevented. Therefore, in the variable nozzle unit 40 and the variable-capacity supercharger 1 according to the present embodiment, it is conceivable that the supercharging efficiency is further improved, and long-term operation is possible with stable supercharging efficiency.

The seal cover 48 used as one of the seal members in the variable nozzle unit 40 of the present embodiment functions as the disc spring supporting the second nozzle ring 43. As the seal cover 48 has the disc spring shape, the sealing characteristic for the clearance formed between the turbine scroll channel 13 side and the turbine wheel 12 side is improved. In comparison with the conventional seal cover 78 (see FIG. 4), the seal cover 48 can be configured to sufficiently secure the oblique part 48b and to bring the ring contact part 48c into contact with the outer circumferential side of the second nozzle ring 43. In this case, since thermal deformation or the like of the variable nozzle unit 40 is prevented, the spring force applied to the second nozzle ring 43 can be more properly controlled.

The second nozzle ring 43 is pressed to the first nozzle ring 42 side by the seal cover 48. The first nozzle ring 42 is pressed to the second nozzle ring 43 side via the heat insulating board 52 by the wave washer 53. In this way, a constitution in which the first nozzle ring 42 and the second nozzle ring 43 are supported in a state in which they are pressed to a member having elasticity from both sides to approach each other is provided. Thereby, the sealing characteristic of the entire variable nozzle unit 40 is improved, and the supercharging efficiency is improved.

Figure 5:
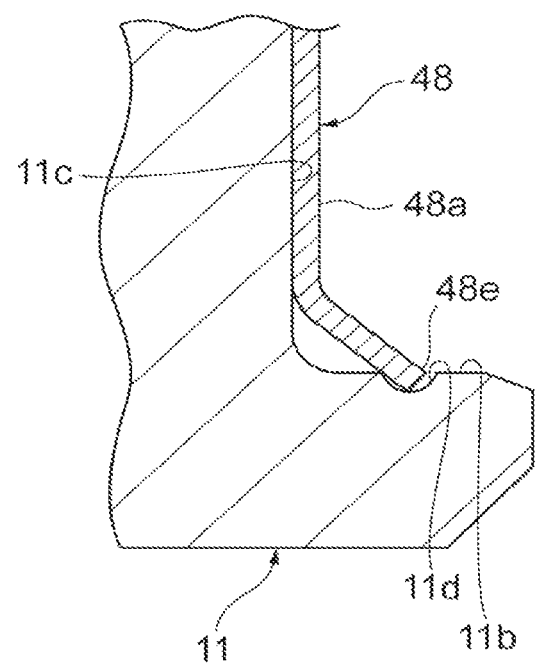
FIG. 5 is a sectional view illustrating a modification of the variable nozzle unit in the variable-capacity supercharger according to the first embodiment, and an enlarged view of the vicinity of an inner circumferential end of a seal cover.

The shape of the turbine housing 11 may be modified to enhance the sealing characteristic caused by the seal cover 48. FIG. 5 is a sectional view illustrating a modification of the shape of the turbine housing 11, and is an enlarged view of the vicinity of the inner circumferential end of the seal cover 48. In the modification illustrated in FIG. 5, a groove part 11d is formed in the outer circumferential surface 11b of the inner circumferential side relative to the step surface 11c of the turbine housing 11. The groove part 11d is provided at a position at which it can receive an inner circumferential end 48e continuing from the support part 48a of the seal cover 48. The seal cover 48 may be mounted in a state in which the inner circumferential end 48e of the seal cover 48 is housed in the groove part 11d of the turbine housing 11 when the variable-capacity supercharger 1 including the variable nozzle unit 40 is assembled. The seal cover 48 may be mounted such that the inner circumferential end 48e of the seal cover 48 is in contact with the outer circumferential surface 11b at the step surface 11c side relative to the groove part 11d.

During operation of the variable-capacity supercharger 1, an internal pressure of a region of the turbine scroll channel 13 side with respect to the seal cover 48 gets higher, compared to an internal pressure of a region of the second support holes 62 side with respect to the seal cover 48. Therefore, during operation, a fluid load results from a pressure difference, and is applied to the seal cover 48 from the turbine scroll channel 13 side. Further, during operation of the variable-capacity supercharger 1, an ambient temperature of the seal cover 48 becomes high. For this reason, when the fluid load applied to the seal cover 48 or the ambient temperature of the seal cover 48 becomes a stricter condition depending on engine development, a possibility of the seal cover 48 receiving the fluid load causing creep deformation is conceivable. In contrast, in the modification illustrated in FIG. 5, a constitution in which the inner circumferential end 48e of the seal cover 48 can be housed in the groove part 11d of the turbine housing 11 is provided. Thereby, even if the seal cover 48 is deformed, the inner circumferential end 48e of the seal cover 48 is housed in the groove part 11d , and thereby additional deformation of the seal cover 48 can be prevented. Therefore, the sealing characteristic for the clearance formed between the turbine scroll channel 13 side and the turbine wheel 12 can be maintained.

(Second Embodiment)

Next, a variable-capacity supercharger including a variable nozzle unit according to a second embodiment will be described with reference to FIG. 6. The variable-capacity supercharger according to the second embodiment is different from the variable-capacity supercharger according to the first embodiment in the following points. That is, in the variable nozzle unit 400 of the variable-capacity supercharger 3 according to the second embodiment, variable nozzles 41 and a first nozzle ring 42 have the same shapes as those of the variable nozzle unit 40 in the first embodiment, and a second nozzle ring 430 has a shape different from that of the second nozzle ring 43 in the variable nozzle unit 40. The variable nozzle unit 400 is also different from the variable nozzle unit 40 in the first embodiment in that, in place of the wave washer 53, a disc spring 54 supports a heat insulating board 52.

Figure 6:
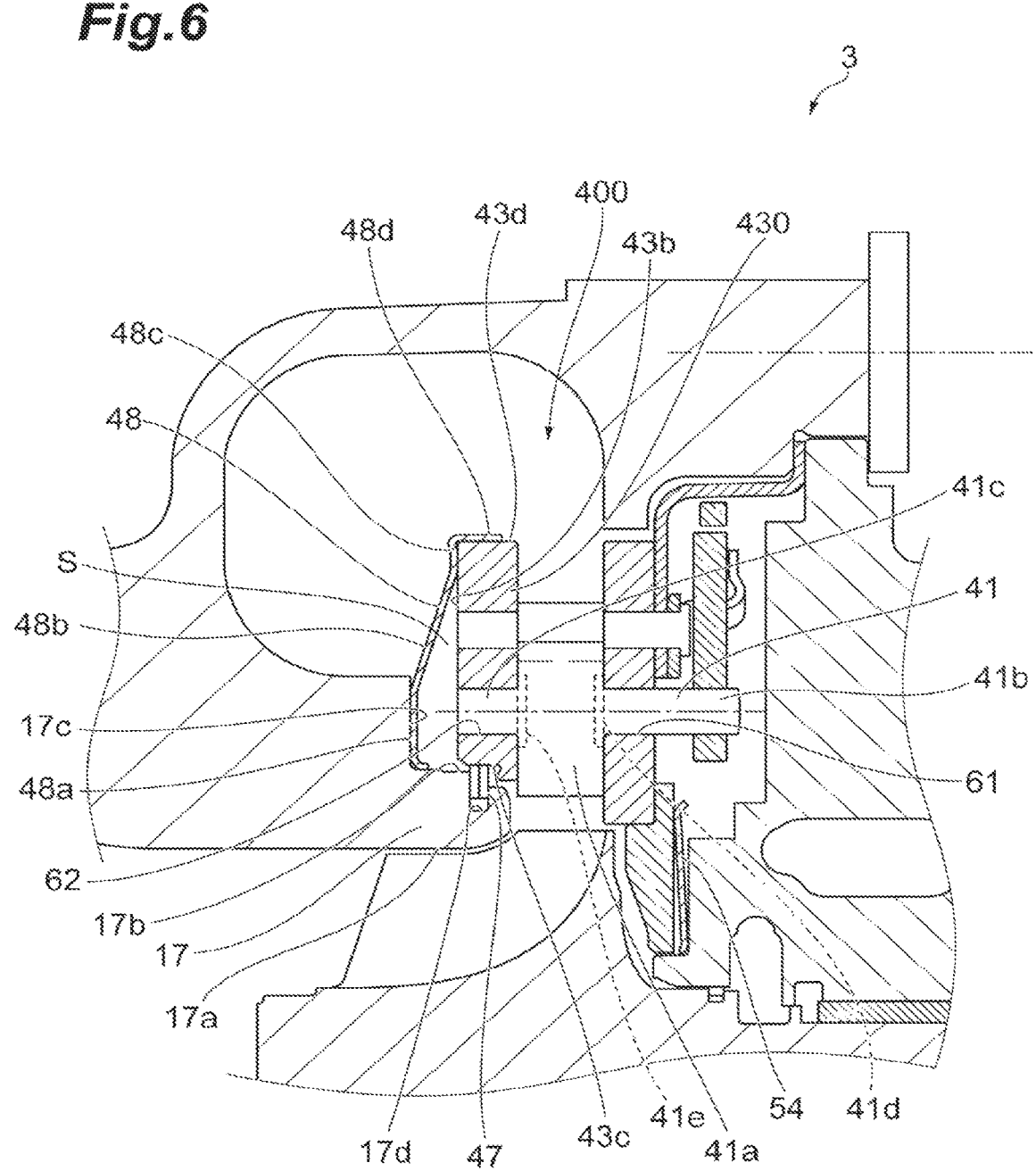
FIG. 6 is a sectional view illustrating a variable nozzle unit in a variable-capacity supercharger according to a second embodiment.

As illustrated in FIG. 6, in the variable nozzle unit 400 of the variable-capacity supercharger 3 according to the second embodiment, the second nozzle ring 430 is not provided with a shroud part, and the shroud part is provided at a turbine housing 11 side. That is, the shroud part 17 extending in the direction of the axis X is formed at an inner circumferential side of the annular second nozzle ring 430 while constituting an inner wall portion inside a turbine scroll channel 13 of the turbine housing 11.

An inner circumferential surface 17a of the shroud part 17 of the turbine housing 11 faces a blade end 12a of a turbine wheel 12, and has a shape following a shape of the blade end 12a. An outer circumferential surface 17b of the shroud part 17 faces an inner periphery 43c of the second nozzle ring 430. In this way, the second nozzle ring 430 faces the turbine housing 11 at a rear surface 43b and the inner periphery 43c. A boundary portion between the second nozzle ring 430 and the turbine housing 11 at the inner periphery 43c of the second nozzle ring 430 is provided at an upstream side (a side close to the variable nozzles 41) relative to the blade end 12a of the turbine wheel 12.

A seal ring 47 is provided between the outer circumferential surface 17b and the second nozzle ring 430. The seal ring 47 has the same shape as the seal ring in the variable nozzle unit 40 of the first embodiment, and is different in a mounted position. That is, as illustrated in FIG. 6, the seal ring 47 is housed in a groove 17d formed in the outer circumferential surface 17b of the shroud part 17. Thereby, the seal ring 47 is disposed to block a space between the outer circumferential surface 17b of the shroud part 17 and the inner periphery 43c of the second nozzle ring 430.

A step surface 17c facing the rear surface 43b in the second nozzle ring 430 is provided between the inner wall portion of the turbine scroll channel 13 and the outer circumferential surface 17b of the shroud part 17 of the turbine housing 11. The step surface 17c is formed apart from the rear surface 43b of the second nozzle ring 430. The seal cover 48 is provided between the step surface 17c of the shroud part 17 and the rear surface 43b of the second nozzle ring 430. The seal cover 48 has the same shape as the seal cover in the variable nozzle unit 40 of the first embodiment. As illustrated in FIG. 6, the seal cover 48 is in contact with the step surface 17c of the shroud part 17 at a support part 48a, and is in contact with the second nozzle ring 430 at a ring contact part 48c and a ring support part 48d. In this state, the seal cover 48 is supported between the shroud part 17 of the turbine housing 11 and the second nozzle ring 430. Thereby, a space between the turbine scroll channel 13 side and the turbine wheel 12 is blocked by the seal cover 48. As in the first embodiment, this seal cover 48 functions as a disc spring supporting the second nozzle ring 430.

In this way, to prevent the turbine scroll channel 13 and the turbine wheel 12 side from communicating with each other, the two seal members, namely the seal ring 47 and the seal cover 48, are mounted at the rear surface 43b side and the inner periphery 43c side of the second nozzle ring 430. Thereby, an exhaust gas flowing along the turbine scroll channel 13 passes through the variable nozzles 41 sides of the facing surface 43a side of the second nozzle ring 430, and flows into the turbine wheel 12 side.

In the variable nozzle unit 400 according to the present embodiment, in place of the wave washer 53, the disc spring 54 is used as an elastic member supporting the first nozzle ring 42 via the heat insulating board 52. Like the wave washer 53, the disc spring 54 also prevents the heat insulating board 52 and the first nozzle ring 42 from being deformed by a spring force. The first nozzle ring 42 is configured to be pressed against the second nozzle ring 430 via the heat insulating board 52 by the disc spring 54, and thereby a sealing characteristic between the first nozzle ring 42 and the second nozzle ring 430 is improved. The member supporting the first nozzle ring 42 via the heat insulating board 52 is not limited thereto, and may be appropriately modified.

Here, in the variable-capacity supercharger 3 including the variable nozzle unit 400 according to the present embodiment, the seal ring (the first seal member) 47 and the seal cover (the second seal member) 48 are also provided as the two seal members. These members can inhibit circulation of the exhaust gas from the rear surface 43b side and the inner periphery 43c side of the second nozzle ring 430. Thereby, performance of the entire supercharger and workability are improved. This point is the same as in the variable nozzle unit 40 of the variable-capacity supercharger 1 according to the first embodiment.

Further, the variable-capacity supercharger 3 of the present embodiment is different from the variable-capacity supercharger 1 of the first embodiment and the conventional variable-capacity supercharger 2 in that the shroud part 17 corresponding to the shape of the turbine wheel 12 is formed by the turbine housing 11. For example, as in the variable-capacity supercharger 1 of the first embodiment, when the shroud part 44 following the blade shape of the turbine wheel 12 is formed by the second nozzle ring 430, if a flow of the exhaust gas not passing through the variable nozzles 41 is formed on the rear surface 43b of the second nozzle ring 430, an end of the turbine wheel 12 side within the boundary portion between the second nozzle ring 430 and the turbine housing 11 becomes a downstream (exhaust gas outlet) side relative to the turbine wheel 12. In contrast, in the variable-capacity supercharger 3 according to the present embodiment, the shroud part 17 is formed by the turbine housing 11, and thereby a boundary portion of the turbine housing 11 which continues from the rear surface 43b of the second nozzle ring 430 and is formed at the inner periphery 43c of the second nozzle ring 430 is provided upstream (the side close to the variable nozzles 41) from the blade end 12a of the turbine wheel 12. Thereby, even if the seal ring 47 and the seal cover 48 are degraded and the flow of the exhaust gas is formed at the rear surface 43b side and the inner periphery 43c side of the second nozzle ring 430, an outlet thereof is located upstream from the turbine wheel 12. Thereby, the flow of the exhaust gas of the rear surface 43b side and the inner periphery 43c side can also contribute to rotation of the turbine wheel 12, and an effect of enabling prevention of a reduction in supercharging efficiency is obtained.

While the variable nozzle unit and the variable-capacity supercharger according to embodiments of the present disclosure have been described, the present disclosure is not limited to the aforementioned embodiments, and can be modified in various ways without departing from the summary thereof.

For example, shapes of the variable nozzle unit and the variable-capacity supercharger according to the aforementioned embodiments are merely examples, and may be appropriately modified without departing from the spirit of the present disclosure. For example, in the present embodiment, the constitution in which the seal ring 47 and the seal cover 48 are provided as the plurality of seal members has been described, but the number of seal members and shapes of the seal members can be appropriately modified. Only one of the plurality of seal members needs to be configured to be disposed in the clearance from the turbine housing 11 at the rear surface side of the second nozzle ring 43 or 430 and downstream from the second support holes 62.

Further, the shapes of the turbine housing 11, the first nozzle ring 42, and the second nozzle ring 43 or 430, and a constitution of a link mechanism including the link members 45 or the like for rotating the variable nozzles 41 may also be appropriately modified.

INDUSTRIAL APPLICABILITY

According to the present disclosure, a variable nozzle unit and a variable-capacity supercharger ill which supercharging efficiency is further improved are provided.

REFERENCE SIGNS LIST 1, 2, 3 Variable-capacity supercharger
10 Turbine
11 Turbine housing
12 Turbine wheel
12a Blade end
13 Turbine scroll channel
16 Exhaust gas outlet
17 Shroud part
17a Inner circumferential surface
17b Outer circumferential surface
17c Step surface
17d Groove
20 Compressor
21 Compressor housing
31 Bearing housing
32 Rotary shaft
40 Variable nozzle unit
41 Variable nozzle
41a Nozzle part
41b First nozzle shaft
41c Second nozzle shaft
42 First nozzle ring
42a Facing surface
42b Rear surface
43 Second nozzle ring
43a Facing surface
43b Rear surface
44 Shroud part
44a Inner circumferential surface
44b Outer circumferential surface
44c Groove
45 Link member
46 Drive ring
47 Seal ring (example of seal member)
48 Seal cover (example of seal member)
48a Support part
48b Oblique part
48c Ring contact part
48d Ring support part
48e Inner circumferential end
49 Transmission
50 Support ring
51 Coupling pin
52 Heat insulating board
53 Wave washer
54 Disc spring
61 First support hole
62 Second support hole
70 Variable nozzle unit
71 Variable nozzle
71c Second nozzle shaft
72 First nozzle ring
73 Second nozzle ring
74 Shroud part
75 Second support hole
400 Variable nozzle unit
430 Second nozzle ring

The invention claimed is:

1. A variable nozzle unit that is disposed between a turbine scroll channel and a turbine wheel inside a turbine housing in a variable-capacity supercharger and changes a channel area of an exhaust gas supplied from the turbine scroll channel to the turbine wheel side, the variable nozzle unit comprising:
 a first nozzle ring disposed inside the turbine housing and formed with a plurality of first support holes;
 a second nozzle ring disposed to face the first nozzle ring at a position spaced apart from the first nozzle ring in an axial direction of the turbine wheel and formed with a plurality of second support holes that are through-holes corresponding to the first support holes;
 a plurality of variable nozzles rotatably supported by the first nozzle ring and the second nozzle ring; and
 a plurality of seal members disposed between the turbine scroll channel and the turbine wheel side along a surface of the second nozzle ring which faces the turbine housing,
 wherein the variable nozzles include first nozzle shafts that extend to one sides thereof and are rotatably supported by the first support holes, and second nozzle shafts that extend to the other sides thereof and are rotatably supported by the second support holes, and
 a first seal member included in the plurality of seal members is provided at the turbine wheel side relative to the second support holes.

2. The variable nozzle unit according to claim 1, wherein a second seal member included in the plurality of seal members is provided at the turbine scroll channel side relative to the second support holes.

3. A variable-capacity supercharger including the variable nozzle unit according to claim 1, in which the turbine housing includes a shroud part, an inner circumferential surface of which faces a blade end of the turbine wheel and which has a shape following a shape of the blade end, at an inner circumferential side thereof relative to the second nozzle ring.

4. A variable-capacity supercharger including the variable nozzle unit according to claim 2, in which the second seal member is in contact with the turbine housing at an inner circumferential side thereof, is in contact with the second nozzle ring at an outer circumferential side thereof, and is in the shape of a disc spring pressing the second nozzle ring.

5. The variable-capacity supercharger according to claim 4, wherein:
 the first nozzle ring and the second nozzle ring are fixed by coupling pins; and
 an inner circumferential end of a contact part of the second seal member with the second nozzle ring is located outside in a radial direction relative to mounted positions of the coupling pins.

6. A variable-capacity supercharger including a variable nozzle unit that is disposed between a turbine scroll channel and a turbine wheel inside a turbine housing and changes a channel area of an exhaust gas supplied from a turbine scroll channel to a turbine wheel side, in which the variable nozzle unit includes: a first nozzle ring disposed inside the turbine housing and formed with a plurality of first support holes; a second nozzle ring disposed to face the first nozzle ring at a position spaced apart from the first nozzle ring in an axial direction of the turbine wheel and formed with a plurality of second support holes that are through-holes corresponding to the first support holes; a plurality of variable nozzles rotatably supported by the first nozzle ring and the second nozzle ring; and a plurality of seal members disposed along a surface of the second nozzle ring which faces the turbine housing between the turbine scroll channel and the turbine wheel side, the variable nozzles include first nozzle shafts that extend to one sides thereof and are rotatably supported by the first support holes, and second nozzle shafts that extend to the other sides thereof and are rotatably supported by the second support holes, and a first seal member included in the plurality of seal members is provided at the turbine wheel side relative to the second support holes, a second seal member included in the plurality of seal members is provided at the turbine scroll channel side relative to the second support holes, is in contact with the turbine housing at an inner circumferential side thereof, is in contact with the second nozzle ring at an outer circumferential side thereof, and is in the shape of a disc spring pressing the second nozzle ring, and the turbine housing has a groove part allowing insertion of an inner circumferential end of the second seal member.

7. A variable-capacity supercharger including the variable nozzle unit according to claim 2, in which the turbine housing includes a shroud part, an inner circumferential surface of which faces a blade end of the turbine wheel and which has a shape following a shape of the blade end, at an inner circumferential side thereof relative to the second nozzle ring.

\* \* \* \* \*